Nov. 29, 1932.  E. G. C. LOFGREN ET AL  1,888,992
ELECTRIC TOASTER
Filed Jan. 2, 1931  2 Sheets-Sheet 1
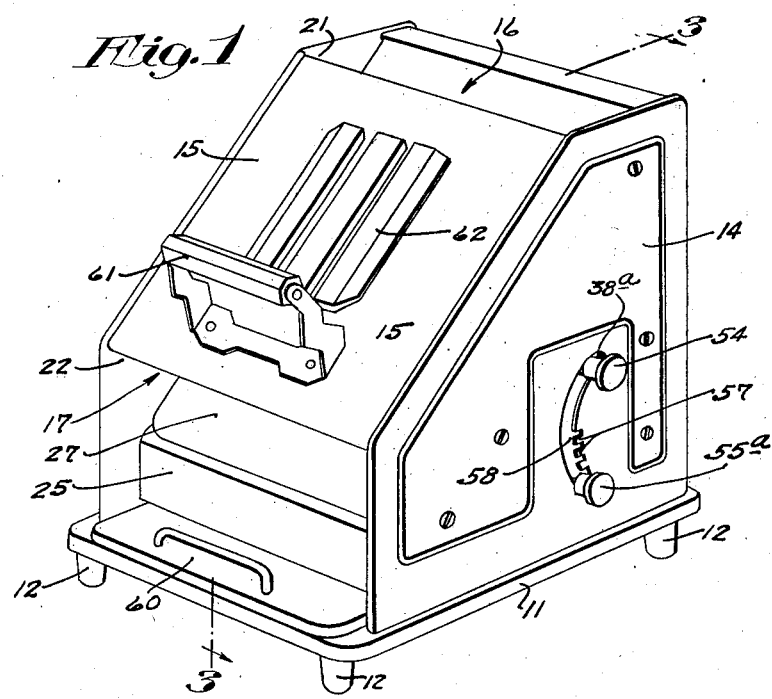
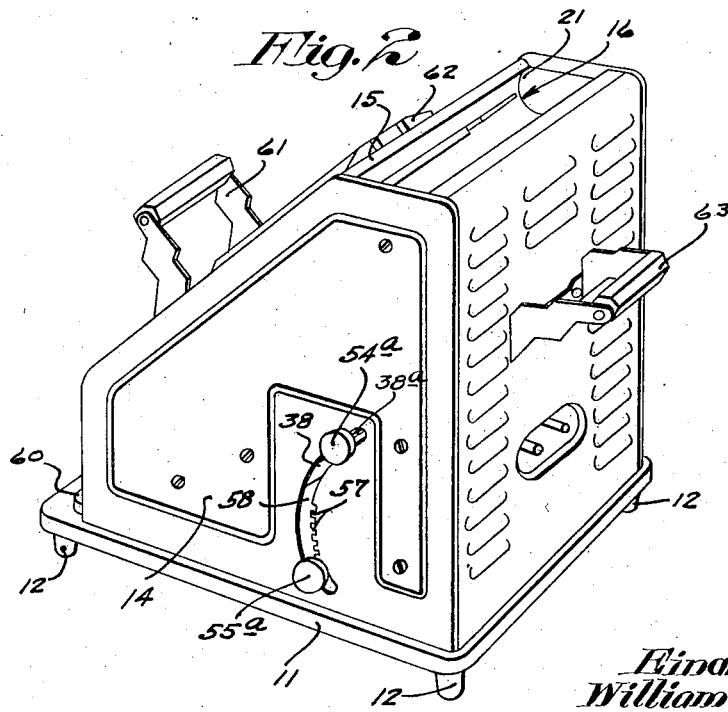
Inventor
Einar G. C. Lofgren
William M. Anderson
By their Attorneys Nov. 29, 1932.    E. G. C. LOFGREN ET AL    1,888,992
ELECTRIC TOASTER
Filed Jan. 2, 1931    2 Sheets-Sheet 2
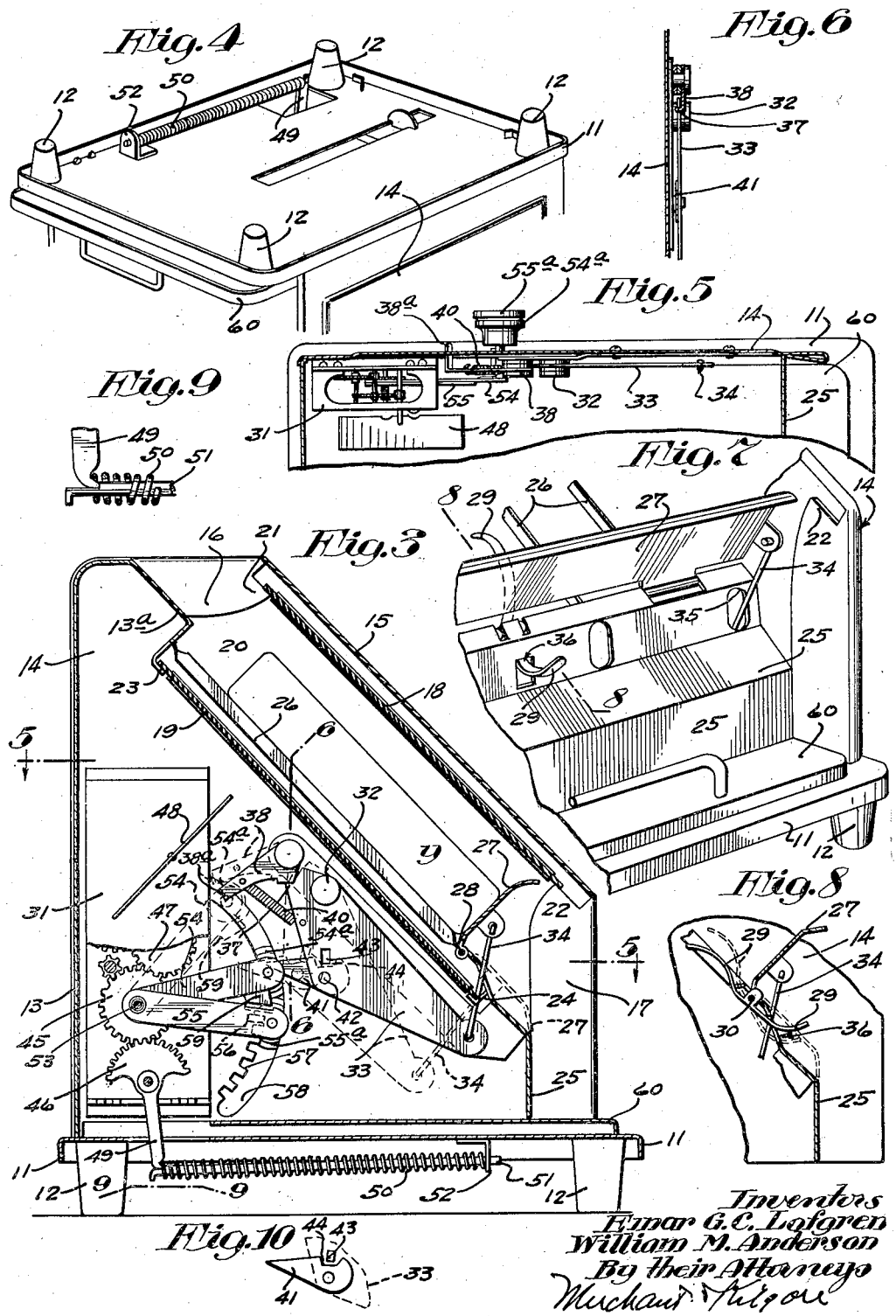
Inventors
Einar G. C. Lofgren
William M. Anderson
By their Attorneys Patented Nov. 29, 1932

1,888,992

UNITED STATES PATENT OFFICE

EINAR G. C. LOFGREN AND WILLIAM M. ANDERSON, OF MINNEAPOLIS, MINNESOTA, ASSIGNORS OF SIX-TENTHS TO W. A. WRIGHT, C. K. CARLSTROM, AND L. J. DAWSON, ALL OF MINNEAPOLIS, MINNESOTA

ELECTRIC TOASTER

Application filed January 2, 1931. Serial No. 506,206.

Our present invention relates to timed electric toasters and is in the nature of an improvement on or refinement of the toaster disclosed and claimed in our pending application, Serial Number 339,113, filed February 11, 1929, but certain of the novel features herein disclosed and claimed may be found serviceable and desirable in toasters varying considerably in design from that of said prior application. In the toaster of our prior application, electric heating elements were spaced and arranged to afford an inclined toasting chamber open at its top for the reception of bread and open at its bottom for the discharge of the toast, and in connection therewith, there is provided a detent for intercepting and holding the toast in the toasting zone between the electrical heating elements, and this combined with timed mechanism for tripping the detents and permitting the discharge of the toast. The detents of the prior application did not, to any material extent, close the air passage through the toasting zone between the electrical heating elements, but simply act as intercepting devices. As an important feature of the present invention, the detent which serves the function of the detents of the earlier application, are incorporated in a plate-like gate which, as an additional function, serves to substantially or materially close the air passage through the toasting zone and by cutting off air currents during the toasting action, prevents the waste of heat and accelerates the toasting action. As another important feature, the invention comprises so-called toast kickers which simultaneously with dropping of the gate to discharge the toast, lightly taps the toast and breaks and cohesion between the toast and the inclined skids that support the same, and insures and initiates the downward discharge of the toast. The invention also includes other correlated features whereby simplicity of structure and certainty of action is insured.

In the accompanying drawings which illustrate the invention, like characters indicate like parts throughout the several views.

Referring to the drawings:

Fig. 1 is a perspective view looking at the front and one side of the toaster;

Fig. 2 is a perspective view looking at the back and one side of the toaster;

Fig. 3 is a vertical front to rear section taken substantially on the line 3—3 of Fig. 1;

Fig. 4 is a fragmentary perspective looking at the bottom of the toaster;

Fig. 5 is a fragmentary horizontal section taken on the line 5—5 of Fig. 3;

Fig. 6 is a fragmentary section taken on the line 6—6 of Fig. 3;

Fig. 7 is a fragmentary perspective looking at the front portion of the toaster with the inclined top plate removed;

Fig. 8 is a fragmentary section taken on the line 8—8 of Fig. 7;

Fig. 9 is a fragmentary detail partly in vertical section and partly in elevation showing parts found in the vicinity of the line marked 9—9 on Fig. 3; and Fig. 10 is a detail showing the so-called cam dog removed from the gate or detent-actuating lever in which it is normally applied.

The toaster casing is made up of a base plate 11, as shown supported by short legs 12, a back plate 13, side plates 14 and an oblique top plate 15. The upper edge of oblique top plate 15 is spaced from the inturned upper edge 13ª of back plate 13 to afford a bread inlet passage at 16 and the lower edge of said plate 15 is spaced from the front edge of the bottom plate 11 so as to afford a large toast discharge passage at 17. The electrical heating elements 18 and 19 are obliquely disposed and spaced apart to afford a toasting chamber 20. Upper heating element 18 is shown as supported on inturned lugs 21 and 22 of the side plates 14 and the lower heating element 19 is shown as supported on inturned lugs 23 and 24 formed, respectively, on inturned portion 13ª of back plate 13 and on a short front plate 25 secured to the side plates 14. Secured at their upper ends to the lugs 23 and to the upper edge of front plate 25 are oblique grid bars 26, the upper edges of which are smooth and upon which the bread slice or toast y will rest while being toasted.

The detent-acting gate 27, at its lower edge, is hinged to the upper edge of the front plate 25 at 28, said hinge being located substantially at the connection between the upper edge of said front plate 25 and the lower ends of the grid bars 26 so that when said gate is turned down against the upper portion of said front plate, it forms a continuation of the oblique supporting surface afforded by said grid bars. This gate 27 is of such size that when turned up to operative toast-supporting position shown by full lines in Fig. 3, it will nearly or quite close the lower end of the toasting chamber 20 and nearly or quite cut off the upward circulation of air through the toasting chamber or zone.

The toast kickers 29 of which there are preferably several, are, as shown and preferably, intermediately pivoted on a small transverse rod 30 that also serves to pivotally connect the gate 27 to the upper edge of the front plate 25 and to anchor the lower ends of the skid bars 26 to the upper edge of said front plate 25. Normally, the relatively heavy upper ends of the kickers 29 lie below the plane of the upper surfaces of the skid bars 26 and the lower ends of said kickers project above the plane of said skid bars and of the inturned upper edge of the front plate 25, as shown by full lines in Fig. 8.

The mechanism for operating the gate with a timed action includes a timed motor or mechanism, a preferred form of which is illustrated in the drawings and as shown comprises as follows:

Located in the lower portion of the casing and, as shown, secured to one of the side plates 14 is a gear housing 31 and pivoted to the same side plate at 32 is a gate-actuating lever 33, see particularly Fig. 3. The lower end of lever 33, see Figs. 3 and 7, is connected by a link 34 to a lug on one end of the gate 27 and here it will be noted that the upper portion of front plate 25 has a hole 35 through which the link 34 is freely passed and has other holes 36 through which the lower ends of kickers 29 freely work. At its short upper end, lever 33 has a latch lug or shoulder 37 which, in the operative position of the gate 27, is engaged by a latch dog 38 that is pivoted at 39 to the same side plate to which lever 33 is pivoted. The long arm of latch dog 38 is connected to lever 33 by a coiled spring 40, all as best shown in Fig. 3. To the intermediate portion of lever 33 is a cam-acting dog 41 pivoted at 42. Lever 33 has a projecting stop lug 43 that co-operates with a long notch 44 in dog 41 to limit the pivotal movements of said dog in respect to said lever in a manner and for a purpose which will hereinafter more fully appear.

Mounted within the gear housing 31 is a chain of intermeshing gears 45, 46 and 47, and which latter gear through other gears in this particular motor drives a retarding fan blade 48. Gear 46 has a depending arm 49 that is subject to a motor spring 50. This motor spring 50, as shown, is a compression spring mounted on a rod 51, one end of which moves through a keeper bracket 52 on the bottom plate 11 and on the other end of which is slidable in respect to the end of arm 49, so that spring 50 reacts against said arm 49. Gear 45 is secured to a short shaft 53 to which also is secured one end of a timed trip arm 54, shown best in Fig. 3. Pivoted on shaft 53 is an adjustable stop arm or member 55 that will limit the downward movement of arm 54 as and for a purpose presently to be noted. Stop arm 55 has a small laterally projecting lug or tooth 56 shown by dotted lines in Fig. 3 that normally engages between teeth 57 formed in one edge of a segmental slot 58 cut in one of the side plates 14. Also stop arm 55 has a projecting knob 55ª which, when pressed inward, springs arm 55 so as to disengage lug 56 from between teeth 57, thereby permitting said stop lever to be set in various different more or less depressed positions. Arm 54 has a projecting knob 54ª, the stem of which works through slot 58 but without interlocking engagement with the teeth 57. In the particular structure illustrated arm 54 is shown as provided with a lip 59 that engages against the upper edge of stop lever 55 to limit the downward movement of arm 54. Here it will be noted by reference to Fig. 3 that the long arm of latch dog 38 and the projecting end of cam dog 41 project into the path of movement of knob 54ª of timed trip arm 54.

In the drawings of this application, the toaster, as in our prior application, is shown as provided with a sliding shelf 60 arranged to slide on top of the bottom plate 11 from a slid-in position shown by full lines in Figs. 1, 2 and 3, into a withdrawn position in which it will receive the toast dropped from the toasting chamber. Also as shown, the inclined top plate 15 at its lower portion has an upstanding handle 61 and above the handle is provided with louvers 62, which latter permit the escape of a small amount of heat from the toasting zone so that toast placed thereon and against the handle 61 will be kept warm while other bread slices are being toasted. Also the toaster, as shown, is provided on its back plate with a second handle 63.

*Operation*

The length of time that the bread placed in the toasting chamber will be subjected to toasting action will be determined by the more or less depressed set position of stop lever 55, and, as will presently appear, if not already obvious, the lower the position in which the stop lever 55 is set, the longer will be the toasting action. Immediately after a slice of toast has been dropped from the toaster, the movable parts of the gate-actuating mechanism will be in positions indicated by dotted lines in Fig. 3. To set the toaster for action with the gate 27 closed, the operator takes hold of the knob 54ª of timed trip arm 54 and depresses the same until lever 54 is stopped against stop lever 55. The initial downward movement of arm 54 carries the stem of its knob 54ª away from the long end of latch dog 38, and further downward movement of said arm 54 brings the stem of its knob 54ª against the projecting end of cam dog 41 and as downward movement of said cam dog is limited in respect to lever 33, the stem of said knob 54ª in passing downward beyond said cam dog, forces the lower end of lever 33 upward until the gate 27 has been closed and latch dog 38 has engaged gate 37 and latched said lever and gate in the set position shown by full lines in Fig. 3.

Furthermore, downward movement of the arm 54 operating through gears 45 and 46 puts motor spring 50 under increased compression so that as soon as downward pressure on knob 54ª has been released, said spring operative through the gears and with an action retarded by the fan blade 48 and the friction of the mechanism will impart a slow upward timed movement to arm 54. Under upward movement of arm 54, the stem of its knob 54ª simply cams the then yielding cam dog 41 out of its path of movement without imparting or attempting to impart movement to lever 33. At the very completion of the upward movement of arm 54, the stem of its knob 54ª strikes the projecting end of latch dog 38 and releases said dog from the lug 37 of lug 33, thereby releasing said lever 33. When said lever 33 is thus released, latch dog 38 being then held by arm 54 under tension from motor spring 50, will become a base of reaction for spring 40 and the latter will then quickly throw lower end of lever 33 downward and quickly move gate 27 to its downturned toast-releasing position.

When gate 27, under the action of lever 33 and spring 40 is, as just described, quickly thrown to dotted line discharge positions, Figs. 3 and 8, said gate strikes the lower ends of kickers 29, causing the upper ends of said kickers to quickly move upward against the toast and not only breaking all cohesion or all adhesion between the toast and skid bars 26, initiates the downward discharge movement of the toast.

The efficiency of the toaster herein described has been thoroughly demonstrated in actual practice. While the preferred form of the various improved features herein disclosed has been illustrated in the drawings, it will be obvious from the foregoing description and statements made that such features are capable of various modifications all within the scope of the invention herein broadly disclosed and claimed.

By reference particularly to Fig. 5, and also to Figs. 1 and 2, it will be noted that the free end of latch dog 38 is provided with a laterally projecting finger piece or end 38ª that extends outward through the slot 58 where it can be reached with a finger. By pressing upward on the finger piece 38ª latch dog 38 can be released from lever 33 at any time, thereby tripping the discharge mechanism and permitting the toast to be dropped out of the toaster in advance of the tripping action that would take place automatically if the time mechanism were allowed to run to the limit.

What we claim is:

1. In an electric toaster, a casing having electric heating elements spaced and arranged to afford an inclined toasting chamber open at its upper end to receive the bread slices and open at its lower end for the discharge of the toast, inclined grid bars above the lower heating element, a hinge rod supported by the casing, and supporting the lower ends of said grid bars, a detent-acting gate hinged on said hinge rod and arranged when turned upward to substantially close the lower end of inclined toasting chamber, manually-operated means for setting said gate in a chamber-closing position, and automatic means for releasing and dropping said gate to permit the discharge of the toast.

2. In an electric toaster, a casing having electric heating elements spaced and arranged to afford an inclined toasting chamber open at its upper end to receive the bread slices and open at its lower end for the discharge of the toast, inclined grid bars above the lower heating element, a hinge rod supported by the casing and supporting the lower ends of said grid bars, a detent-acting gate hinged on said hinge rod and arranged when turned upward to substantially close the lower end of inclined toasting chamber, a toast kicker intermediately pivoted on said hinge rod and arranged to be engaged and operated by said gate when the latter is dropped and then serving to lift the toast off from said grid bars, means for manually setting said gate in a chamber-closing position, and timed means for releasing and dropping said gate and thereby actuating said kicker.

3. In an electric toaster, a casing having a toasting chamber open at its top for the reception of bread slices and open at its bottom for the discharge of the toast, electrical heating elements in said casing, a detent at the lower end of said toasting chamber, a lever outside of said toasting chamber having a connection for moving said detent to and from operative toast-retaining position, a latch dog for retaining said lever in a position to hold said detent in an operative toast-retaining position, a spring connection between said latch dog and lever, a manually set trip member, means whereby movement of said trip member to set position will cause said lever to move said detent into operative position and said latch dog to secure said lever in such position, power operated timed means for moving said trip member from its set position back to normal position, the final return movement of said trip member to normal position operating on said trip dog to release the same and throw said lever to cause said detent to be retracted and the toast released.

4. The structure defined in claim 3 in which the means for moving said lever to position to set said detent includes a cam dog pivoted to said lever for limited movement, the movement of said trip member to set position being operative thereon but said cam dog under return movement of said trip member having pivotal movement then rendering said trip member inactive on said lever.

5. The structure defined in claim 3 in which the means for moving said lever to position to set said detent includes a cam dog pivoted to said lever for limited movement, the movement of said trip member to set position being operative thereon but said cam dog under return movement of said trip member having pivotal movement then rendering said trip member inactive on said lever, the said detent being in the form of a gate which, when moved to toast-retaining position substantially closes the lower end of said toasting chamber.

In testimony whereof we affix our signatures.

EINAR G. C. LOFGREN.
WILLIAM M. ANDERSON.